J. R. NIXON.
GAME.
APPLICATION FILED DEC. 18, 1909.

960,190.

Patented May 31, 1910.
3 SHEETS—SHEET 1.

WITNESSES
Samuel E. Wade
O. E. ...

INVENTOR
JAMES R NIXON
BY Munn & Co.
ATTORNEYS

J. R. NIXON.
GAME.
APPLICATION FILED DEC. 18, 1909.
960,190.
Patented May 31, 1910.
3 SHEETS—SHEET 2.
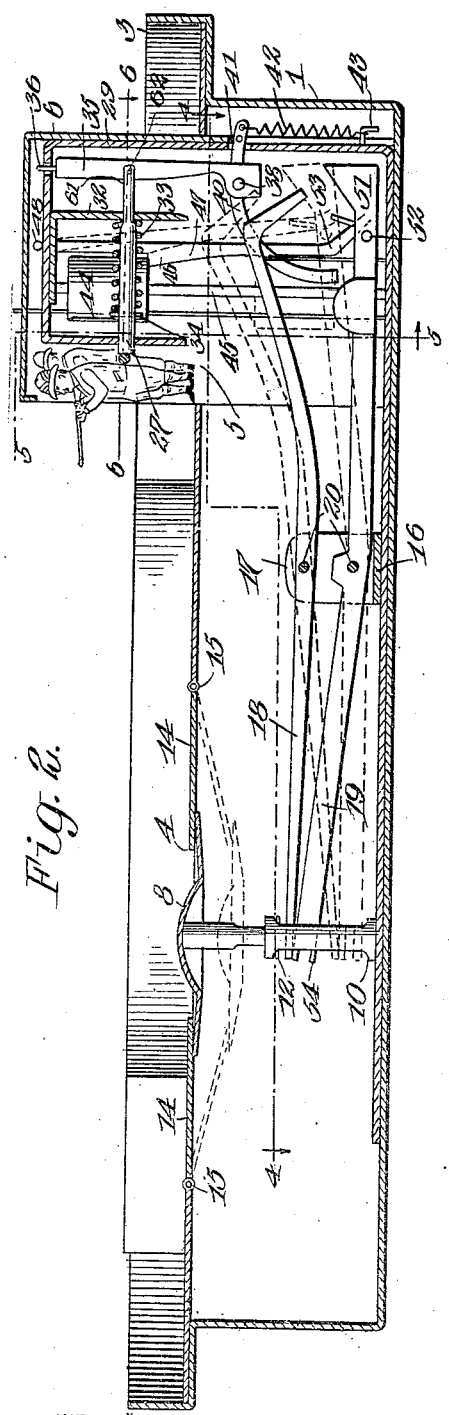
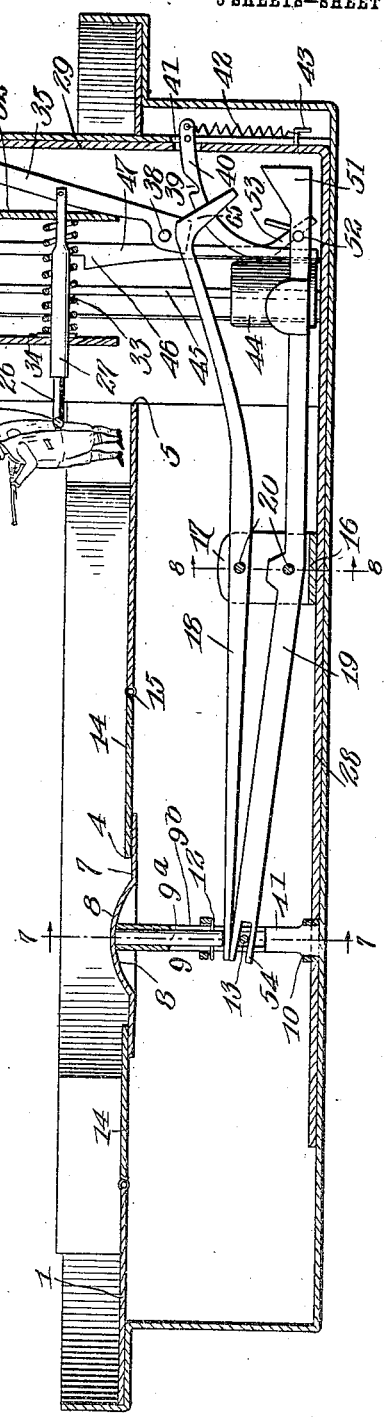
WITNESSES
Samuel E. Wade
O. E. Train
INVENTOR
JAMES R. NIXON
BY
ATTORNEYS

J. R. NIXON.
GAME.
APPLICATION FILED DEC. 18, 1909.

960,190.

Patented May 31, 1910.
3 SHEETS—SHEET 3.

WITNESSES
Samuel E. Wade.
C. E. Train

INVENTOR
JAMES R. NIXON
BY Munn & Co.
ATTORNEYS

UNITED STATES PATENT OFFICE.

JAMES ROBERT NIXON, OF NEW ORLEANS, LOUISIANA, ASSIGNOR TO GEORGE L. MARTIN, OF NEW ORLEANS, LOUISIANA.

GAME.

960,190.  Specification of Letters Patent.  Patented May 31, 1910.

Application filed December 18, 1909. Serial No. 533,749.

*To all whom it may concern:*

Be it known that I, JAMES ROBERT NIXON, a citizen of the United States, and a resident of New Orleans, Orleans parish, State of Louisiana, have invented certain new and useful Improvements in Games, of which the following is a specification.

My invention is an improvement in games, and consists in certain novel constructions and combinations of parts hereinafter described and claimed.

The object of the invention is to provide an amusing and instructive game wherein a field having hazards is provided, and a balanced lever, to one end of which is connected figures adapted to be moved into view when the lever is rocked by the weight of other figures movable over the field.

Figure 1:
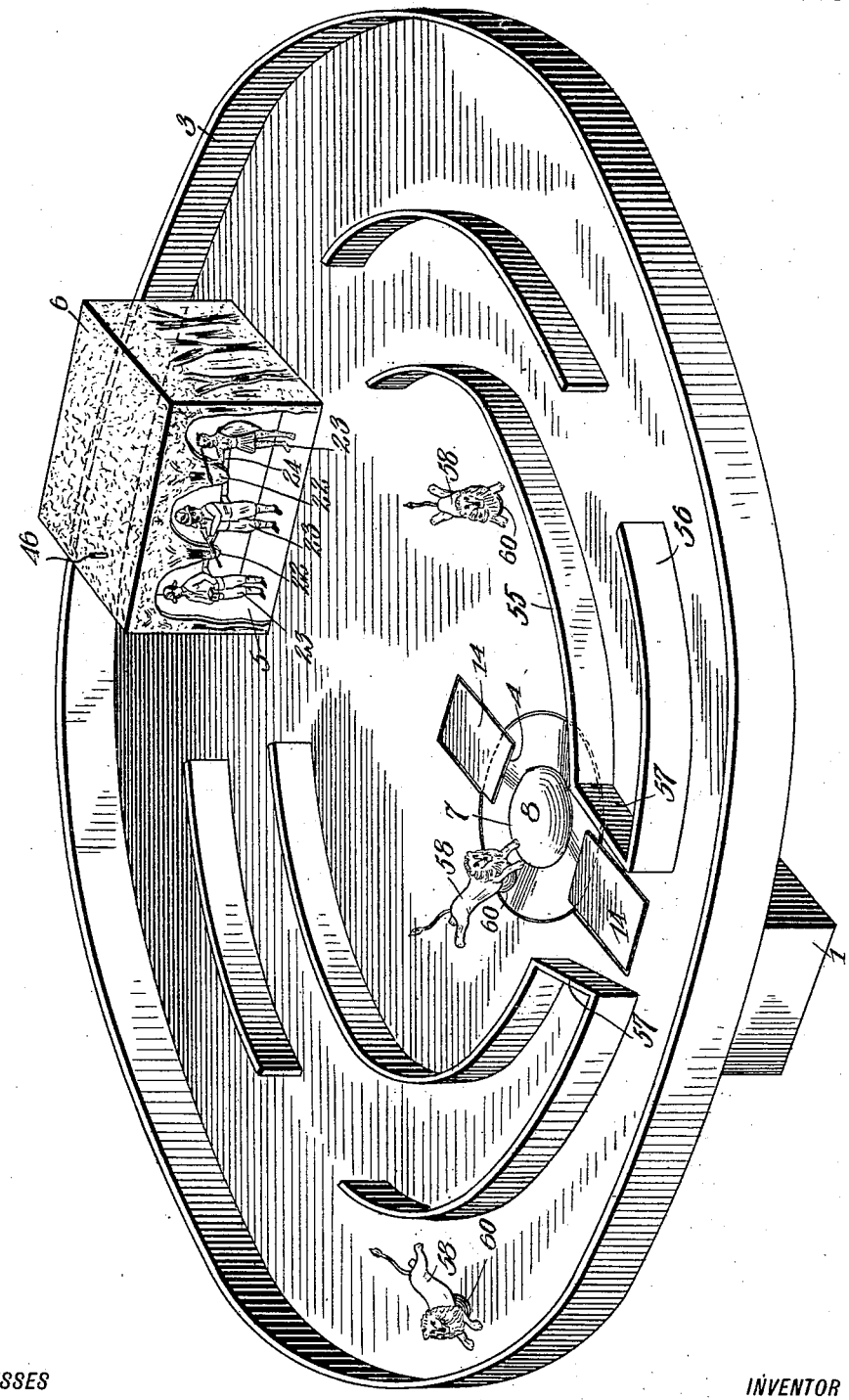
Figure 4:
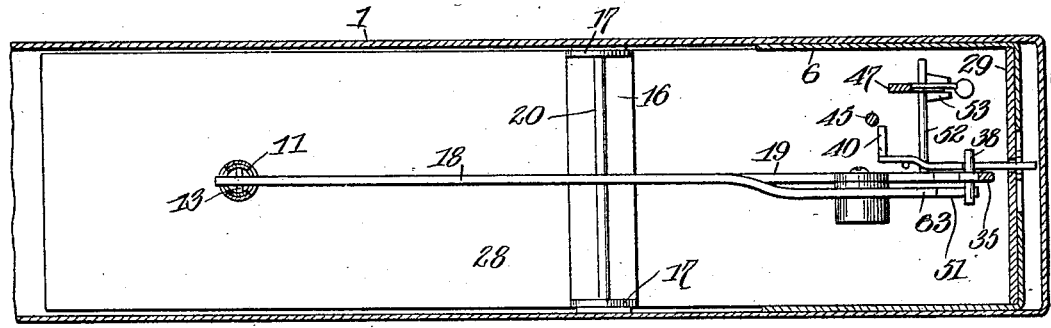
Figure 5:
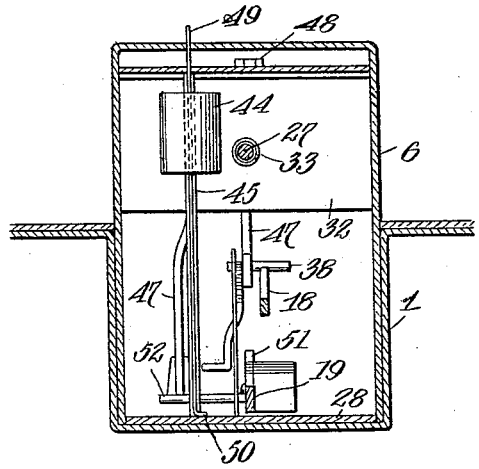
Figure 6:
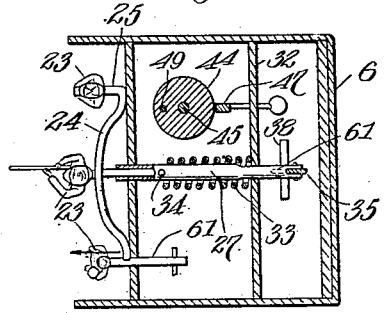
Figure 7:
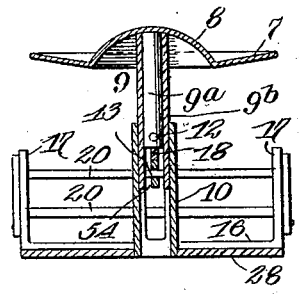
Figure 8:
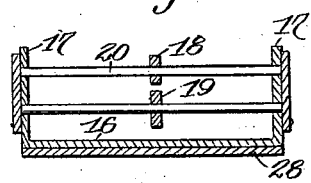
Figure 9:
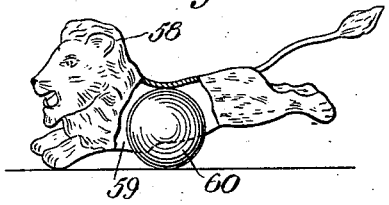

Referring to the drawings forming a part hereof: Figure 1 is a perspective view of the improvement; Fig. 2 is a longitudinal section with the parts in one position; Fig. 3 is a similar view with the parts in another position; Fig. 4 is a section on the line 4—4 of Fig. 2; Fig. 5 is a section on the line 5—5 of the same figure; Fig. 6 is a section on the line 6—6 of the same figure; Fig. 7 is a section on the line 7—7 of Fig. 3; Fig. 8 is a section on the line 8—8 of the same figure; and Fig. 9 is a side view partly in section of one of the figures.

The present embodiment of the invention comprises a casing 1 substantially rectangular in cross section, which supports a substantially circular field or track 2 having an upright marginal annular flange 3. Near one side the field is provided with a circular opening 4, and near the other side with a rectangular opening 5 over which is a shelter or hood 6. Both of the openings 4 and 5 communicate with the casing, and the opening 4 is normally closed by a circular plate or disk 7 having a central boss 8. A post 9 is connected with the lower face of the boss, and the lower end of the post extends into a hollow standard 10 fixed to the bottom of the casing, and having in opposite sides slots 11 for a purpose to be described.

The disk 7, it will be observed, is slightly cupped, that is, the portion next to the boss is lower than the outer edge. A pin 12 extends through the post in a direction transverse to the casing, and a second pin 13 extends through the post at right angles to the first pin and below the same, and the upper pin 12 is adapted to engage the top of the standard to limit the upward movement of the post.

The circular opening 4 is extended on opposite sides as shown in Fig. 1, and the extensions are closed by doors 14, the doors being hinged, as at 15, to the plate forming the floor of the field, at the opposite end from the circular opening, and the free ends of the doors rest upon the disk 7, as shown in Figs. 2 and 3.

Inside the casing and between the standard 10 and the shelter 6 a bracket 16 is secured, the ends of the bracket being turned upwardly, as at 17, and a pair of levers 18 and 19, is supported by the upturned ends, the levers having trunnions 20 which engage bearings in the ends.

The shelter 6 is provided with an open front, as shown, and may be suitably decorated, as shown in Fig. 1, and the front is partially subdivided into three divisions by extensions 22 from the top. A plurality of figures (23) are supported in the front of the shelter by means of a bar (24), one of the figures being secured to the center of the bar, and the others to the ends, which are extended forwardly, as at 25, for this purpose.

The inner section of a telescoping stem 26 projects rearwardly from the center of the bar and into the outer section 27 in which it is slidable. A bracket 28 is secured to the bottom of the casing and extends to the rear end thereof, thence upwardly, as at 29, and forwardly, as at 30, beneath the top of the shelter, and downwardly, as at 31, to form a background for the figures. Another bracket 32 projects downwardly from the portion 30 and between the portions 29 and 31, and the stem 26, 27 is slidable in bearings in the bracket 32 and in the portion 31 of the bracket 28, and a coil spring 33 encircles the stem between a pin 34, arranged transversely of the stem, and the bracket portion 32. The rear end of the outer section of the stem is pivoted to a lever 35 whose upper end is provided with a pin 36 which engages an opening 37 in the portion 30 of the bracket 28. The lower end of the lever is provided with a transverse pin 38 which is adapted to engage a notch 39 in an arc-shaped bar 40 which is pivoted at one end in a slot 41 in the casing wall, the said end extending through the slot and being engaged by one end of a coil spring 42, whose other end is secured to a lug 43 on the casing. The spring acts normally to throw the free end of the bar upwardly whereby to retain the pin and the notch in engagement until released by the following mechanism. The said mechanism comprises a weight 44 which is slidable on a vertical rod 45. The weight is normally held in the position shown in Fig. 2 by a lug 46 on a swinging bar 47 pivoted to the top of the shelter, as at 48, the lower end of the weight resting on the lug. When the weight is released it falls, striking the free end of the arc-shaped bar, thus depressing the bar and releasing the pin from the notch. The weight is lifted by a vertical wire 49 which passes through an opening in the weight, and has at its lower end an angular portion 50 for engaging the weight. The weight is released by means of the lever 19. The end 51 of the lever adjacent to the swinging bar is weighted as shown, and is provided with a transverse pin 52, which is adapted to engage the angular end 53 of the swinging lever 47 to swing the same and release the weight. The opposite end of the lever is forked, as at 54, and engages the pin 13 on the post 9.

It will be evident that when the disk is depressed the lever will be tilted and the pin 52 will engage the angular end 53 of the swinging lever 47, and swing the same rearwardly, thus releasing the weight. When the weight falls, it strikes the free end of the arc-shaped bar 40 and release the lever 35. The spring 33 immediately throws the stems 26 and 27 forwardly, moving the figures out of the shelter. The outer section is stopped or checked by the engagement of the pin 34 with the portion 31 of the bracket 28, but the inner section is moved still farther outwardly in the outer section by the weight of the figures.

The upper surface of the field is provided with a plurality of hazards which, as shown in Fig. 1, are arc-shaped and are concentric with the annular flange. The hazards consist of an inner and outer rib 55, 56, the outer rib 56, being interrupted at its center and intermediate its center and ends, while the inner is interrupted only at its center, and transverse ribs 57 connect the ends of the inner and outer ribs at each side of the central interruption. The said interruption is adjacent to the central opening, and the free ends of the ribs converge toward the shelter. A plurality of figures are movable on the field, each comprising a casing 58 of suitable material shaped to represent an animal, in the present instance a lion, and the under portion of each figure is provided with an opening 59, in which is received a ball 60 of heavy material, as for instance, steel.

The figures are represented as in the act of running at full speed with the fore paws and hind paws outstretched (Fig. 9) and with tail extended, and the fore paws are separated laterally, as shown in Fig. 1, to prevent the figures tipping sidewise. The said figures are also suitably colored and are freely movable over the field rolling on the balls. The figures 23 are also suitably colored and are shaped to represent two hunters and a negro guide, the central figure holding a gun, the other white figure a camera and the negro a spear. The bar 24 upon which they are supported is provided at one end with a rearward extension 61, which passes through an opening in the bracket portion 31 and is provided with a transverse pin 62 for limiting the outward movement of the bar.

The lever 18 is provided to snap the disk sharply upward after the mechanism has been tripped, whereby to upset the figures, to imitate their falling when shot. The end of the said lever adjacent to the pin 38 is beveled as at 65, and when the lever 35 is released and is thrown forward by the spring, the pin 38 strikes the beveled end 65, and the lever is rocked to throw the disk sharply upward.

The object of the game is to so manipulate the field and casing, which forms the game board, as to bring as many as possible of the animal or movable figures onto the disk without depressing the same against the resistance of the operating mechanism, whereby to bring out the hunters or human figures. This number will vary, depending to a considerable degree on the skill of the player, since the less manipulation required, the lesser the liability of depressing the disk prematurely.

It will be evident that the hazards might be arranged in any desired manner, and that the form and configuration of the figures may be widely varied. The hinged doors 14 also add greatly to the hazards of the game, and they may be varied in size and arrangement. The animal figures may be stamped out of very light weight tin, aluminum or paper, and they are lightly balanced on the balls to run freely over the field while yet retaining their proper position.

The legs should have enough spread to properly balance the figure, and they should be placed far enough down on the ball to prevent topheaviness. The extremities of the fore paws should also be turned up slightly, in order that they may act somewhat in the manner of sled runners. The field may be of any suitable material and may be ornamented, if desired.

The device is prepared for playing by pushing the figures into the shelter with the fingers, thus telescoping the stem and engaging the pin on the lever to which it is pivoted with the notch of the arc-shaped bar. The weight is then lifted by the wire and seated on the lug and the device is ready for the game.

The post 9 is a telescoping post, the inner section 9ª being secured to the disk 7, while the outer section 9ᵇ is slidable in the hollow standard 10. The end of the lever 18 passes through a slot in the standard, and also through a slot in the outer section 9ᵇ, and the slots are long enough to permit ample play of the lever. The end of the lever 19 is slotted as shown in Fig. 3 and engages the pin 13 which passes through the outer section 9ᵇ. This construction permits the disk to be depressed by the weight of the figures, to trip the operating mechanism for the human figures, and permits the lever 18 to throw up the disk to upset the figures without interference from the other mechanism.

I claim:

1. A game comprising a field having near one edge a circular opening, a plurality of hazards around the opening, a depressible disk normally closing the opening, a shelter at the opposite edge having an open front toward the opening, a plurality of figures in the shelter, a bar to which the figures are secured, a telescoping stem connected with the bar and slidable in bearings in the shelter, a spring normally acting to move the bar out of the shelter, a lever to which the rear end of the stem is pivoted, an arc-shaped bar pivoted by one end and having a notch, a pin on the lever for engaging the notch to hold the bar to which the figures are secured in the shelter, a vertically slidable weight for engaging the free end of the arc shaped bar to release the pin, a lever pivoted at one end and having a lug upon which the weight seats to retain it in elevated position, said lever having an angular portion at its lower end, a lever pivoted by its center below the field, and having a pin for engaging and moving the angular end of the swinging lever to release the weight, a post to which the disk closing the central opening is secured, and an engagement between the post and the other end of the lever for moving said lever.

2. A game comprising a field having an opening near one edge, and a shelter near the opposite edge having an open front toward the opening, hazards around the opening, a plurality of figures movable into and out of the shelter, a plate normally closing the opening in the field, a plurality of movable figures on the field for engaging the plate to depress the same, and a connection between the plate and the figures in the shelter for moving said figures into and out of the shelter when the plate is depressed by the movable figures, said means comprising a rocking lever having one end connected to the plate, a spring acting normally to move the figures out of the shelter, a catch for restraining the operation of the spring, a vertically movable weight for releasing the catch, means for lifting the weight, a swinging lever having a notch for engaging the weight to retain it in elevated position, and means whereby the rocking of the rocking lever will move the swinging lever to release the weight.

3. A game comprising a field having an opening near one edge, and a shelter near the opposite edge having an open front toward the opening, hazards around the opening, a plurality of figures movable into and out of the shelter, a plate normally closing the opening in the field, a plurality of movable figures on the field for engaging the plate to depress the same, and a connection between the plate and the figures in the shelter for moving said figures into and out of the shelter when the plate is depressed by the movable figures, said means comprising a rocking lever having one end connected with the plate, a spring acting normally to move the figures out of the shelter, means for restraining the said movement, a vertically movable weight for releasing the restraining means, means for lifting the weight, means for retaining it in elevated position, and means whereby the rocking of the lever will release the retaining means.

4. A game comprising a field having an opening near one edge, and a shelter near the opposite edge having an open front toward the opening, hazards around the opening, a plurality of figures movable into and out of the shelter, a plate normally closing the opening in the field, a plurality of movable figures on the field for engaging the plate to depress the same, and a connection between the plate and the figures in the shelter for moving said figures into and out of the shelter when the plate is depressed by the movable figures, said means comprising a rocking lever having one end connected to the plate, a spring acting normally to move the figures out of the shelter, means for restraining the action of the spring, and means whereby the rocking of the lever will release the restraining means.

5. A game comprising a field having an opening near one edge, and a shelter near the opposite edge having an open front toward the opening, hazards around the opening, a plurality of figures movable into and out of the shelter, a plate normally closing the opening in the field, a plurality of movable figures on the field, and a connection between the plate and the figures in the shelter for moving said figures into and out of the shelter when the plate is depressed by the movable figures.

6. A game comprising a field having an opening near one edge, and a shelter near the opposite edge having an open front toward the opening, hazards around the opening, a plurality of figures movable into and out of the shelter, a plate normally closing the opening in the field, a plurality of movable figures on the field, a connection between the plate and the figures in the shelter for moving said figures into and out of the shelter when the plate is depressed by the movable figures, and means operated by the figure, moving means for moving the plate upward.

7. A game comprising a field having an opening near one edge, and a shelter near the opposite edge having an open front toward the opening, hazards around the opening, a plurality of figures movable into and out of the shelter, a plate normally closing the opening in the field, a plurality of movable figures on the field for engaging the plate to depress the same, and a connection between the plate and the figures in the shelter for moving said figures into and out of the shelter when the plate is depressed by the movable figures, said means comprising a rocking lever having one end connected to the plate, a spring acting normally to move the figures out of the shelter, means for restraining the action of the spring, and means whereby the rocking of the lever will release the restraining means, and means operated by the movement of the spring for snapping the said plate upward for the purpose specified.

8. In a device of the character specified, a field, a shelter thereon, figures in the shelter, a spring acting normally to move the said figures out of the shelter, means for restraining the operation of the spring, a depressible plate, means whereby the depression of the plate will release the restraining means, figures movable on the field for depressing the plate, and means operated by the spring for snapping said plate upward for the purpose specified.

JAMES ROBERT NIXON.

Witnesses:
WILLIAM B. McCUTCHON,
BERNARD SBISA.